US012657559B2

(12) United States Patent　　　　(10) Patent No.:　US 12,657,559 B2
Rahnama　　　　　　　　　　　　　(45) Date of Patent:　　Jun. 16, 2026

(54) DECENTRALIZED, OPEN BANKING, CONTEXTUAL DECISION SUPPORT TOOL FOR VIRTUAL, AUGMENTED, AND MIXED REALITY

(71) Applicant: Flybits Inc., Toronto (CA)

(72) Inventor: Hossein Rahnama, Toronto (CA)

(73) Assignee: Flybits Inc. (CA)

( * ) Notice: Subject to any disclaimer, the term of this patent is extended or adjusted under 35 U.S.C. 154(b) by 56 days.

(21) Appl. No.: 18/323,310

(22) Filed: May 24, 2023

(65) Prior Publication Data

US 2023/0385790 A1　　Nov. 30, 2023

Related U.S. Application Data

(60) Provisional application No. 63/345,063, filed on May 24, 2022.

(51) Int. Cl.
　　*G06Q 20/10*　　　　(2012.01)
(52) U.S. Cl.
　　CPC ................................. *G06Q 20/108* (2013.01)
(58) Field of Classification Search
　　CPC .... G06F 3/011; G06F 3/0482; G06F 3/04815;
　　　　　　　　G06Q 40/02; G06Q 20/321; G06Q
　　　　　　　　30/0643; G06Q 20/108; G06V 20/20
　　USPC ......................................................... 345/633
　　See application file for complete search history.

(56) References Cited

U.S. PATENT DOCUMENTS

| | | | | |
|---|---|---|---|---|
| 8,751,393 | B1 * | 6/2014 | Murray | G06Q 40/02 |
| | | | | 705/42 |
| 10,482,664 | B1 | 11/2019 | Schlosser et al. | |
| 11,062,390 | B2 * | 7/2021 | Mathwig | G06V 40/172 |

| | | | | |
|---|---|---|---|---|
| 2002/0178096 | A1 * | 11/2002 | Marshall | G06F 3/04815 |
| | | | | 705/35 |
| 2011/0199479 | A1 * | 8/2011 | Waldman | H04N 7/185 |
| | | | | 701/533 |
| 2012/0232977 | A1 * | 9/2012 | Calman | G06Q 30/0251 |
| | | | | 705/14.1 |

(Continued)

FOREIGN PATENT DOCUMENTS

| | | | | |
|---|---|---|---|---|
| IN | 2017-21016264 | | 2/2019 | |
| KR | 20190025431 A | * | 3/2019 | ............ H04W 88/02 |

OTHER PUBLICATIONS

PCT Chapter 2 IPRP dated Aug. 19, 2024, and Article 34 Claims. PCT Search Report dated Sep. 8, 2023.

*Primary Examiner* — Matthew S Gart

*Assistant Examiner* — Mark A Malkowski

(74) *Attorney, Agent, or Firm* — Dickinson Wright LLP; Yuri Chumak

(57)　　　　　　ABSTRACT

Methods and systems for decentralized, open banking, contextual decision support tools in virtual, augmented, and mixed reality environments are provided. According to one example, a wearable electronic device maintains access to a network of decentralized open banking data nodes. After receiving a data operation including contextual data from a plurality of sensors of the wearable electronic device, the device processes the data operation to generate context-aware financial information using industry semantics and updates the display with the results of the data operation and present the context-aware financial information within a zone of the metaverse environment corresponding to a financial category.

20 Claims, 15 Drawing Sheets

(56) References Cited

U.S. PATENT DOCUMENTS

| | | | |
|---|---|---|---|
| 2014/0214460 A1* | 7/2014 | Rahnama | H04L 41/24 |
| | | | 705/5 |
| 2015/0294405 A1* | 10/2015 | Hanson | G06Q 40/02 |
| | | | 705/42 |
| 2016/0026253 A1* | 1/2016 | Bradski | H04N 13/128 |
| | | | 345/8 |
| 2017/0287225 A1 | 10/2017 | Powderly et al. | |
| 2018/0150831 A1* | 5/2018 | Dolan | G06Q 20/321 |
| 2018/0150892 A1* | 5/2018 | Waldron | G06Q 30/0631 |
| 2021/0110460 A1* | 4/2021 | Barklow | G06Q 30/0635 |
| 2021/0271786 A1* | 9/2021 | Duff | G01S 5/02 |
| 2022/0028167 A1* | 1/2022 | Saravanan | G06T 19/003 |
| 2022/0199079 A1* | 6/2022 | Hanson | H04L 51/02 |
| 2022/0350460 A1* | 11/2022 | Eckert | G06F 9/542 |
| 2022/0366494 A1* | 11/2022 | Cella | H04L 9/50 |
| 2023/0230091 A1* | 7/2023 | Vaughn | G06Q 20/4016 |
| | | | 705/71 |

* cited by examiner

System Architecture 100

DECENTRALIZED, OPEN BANKING, CONTEXTUAL DECISION SUPPORT TOOL FOR VIRTUAL, AUGMENTED, AND MIXED REALITY

FIELD OF THE INVENTION

The field of the invention is virtual, augmented, and mixed reality devices, and, in particular, a platform for decentralized, open banking, contextual decision support tools in virtual, augmented, and mixed reality environments.

BACKGROUND

The following description includes information that may be useful in understanding the present invention. It is not an admission that any of the information provided herein is prior art or relevant to the presently claimed invention, or that any publication specifically or implicitly referenced is prior art.

Virtual reality or VR refers to a simulation of the real world using wearable electronic devices used in applications such as gaming, medical, military, business, and education, to name a few. Augmented reality or AR refers to enhancing real-world environments through computer-generated perceptual information, including visual, auditory, haptic, somatosensory, and olfactory modalities. Mixed reality refers to a hybrid of VR and AR. Additionally, 3D simulation refers to creating an immersive digital experience on 2D platforms such as display screens on computers or mobile devices, leveraging perspective and depth cues to convey a sense of three-dimensionality. This can be achieved without requiring wearable electronic devices. As used in the present specification, the term VR should be understood as encompassing VR, AR, mixed reality environments, and 3D simulations on display screens, and the term wearable electronic devices should be understood as encompassing all manner of devices capable of VR computer interaction.

VR is an increasingly popular form of computer interaction. Users benefit from active engagement with the subject matter, which helps to increase education, reduce distraction, promote remote working, and to improve flow, concentration and contribute to improved mental health outcomes.

It is a challenging problem to provide useful VR environments particularly in the area of banking and providing financial information and interaction. The intricate nature of financial data, the requirements for secure interactions, and the demand for intuitive, personalized experiences add layers of complexity to the design and development of such VR environments. Moreover, translating abstract financial concepts and data into visual, auditory, or other sensory representations that can be easily understood and interacted within a VR context is a substantial task. The challenge extends to maintaining security and privacy in these environments, given the sensitive nature of financial information. Additionally, integration with existing banking systems and platforms is necessary to ensure real-time, accurate financial interactions.

There have been prior approaches that have attempted to deliver VR environments in the area of providing financial information and banking. However, such techniques tend to be rudimentary and may not leverage the contextual information of the user's wearable devices and other attributes. As well, the information within each VR application may be sandboxed or isolated from other data or applications, and the data may derive from centralized data sources.

In the realm of financial services, interactions that are often complex, with multi-layered elements and numerous possibilities for transactions and information exchange, are transformed into simplistic, linear experiences in VR. This oversimplification often leads to a loss of functionality and flexibility, limiting the user's ability to interact with their financial information and banking services.

The compartmentalization of information within individual VR applications, coupled with the reliance on centralized data sources, poses barriers to the creation of cohesive, intuitive VR banking environments. The lack of interoperability between different data sources and applications may result in a disjointed experience. Current VR environments also tend to be overly reliant on centralized data sources, which are vulnerable to latency issues, security breaches, and other complications.

Moreover, current VR environments in the banking sector struggle to balance the need for security and privacy with the potential for personalization and convenience that VR can offer. As financial information is sensitive, VR systems are required to handle this data with security measures. However, these safeguards can lead to a less seamless and convenient user experience.

Thus, there is a need for a solution that addresses the shortcomings of the current approaches and provides for immersive, interactive, and secure financial services in VR environments.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of features used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed considering the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

There is a need for decentralized, open banking, contextual decision support tools in VR environments.

BRIEF DESCRIPTION OF THE DRAWINGS

Various objects, features, aspects, and advantages of the inventive subject matter will become more apparent from the following detailed description of preferred embodiments, along with the accompanying drawing figures in which like numerals represent like components.

DETAILED DESCRIPTION

Figure 1:
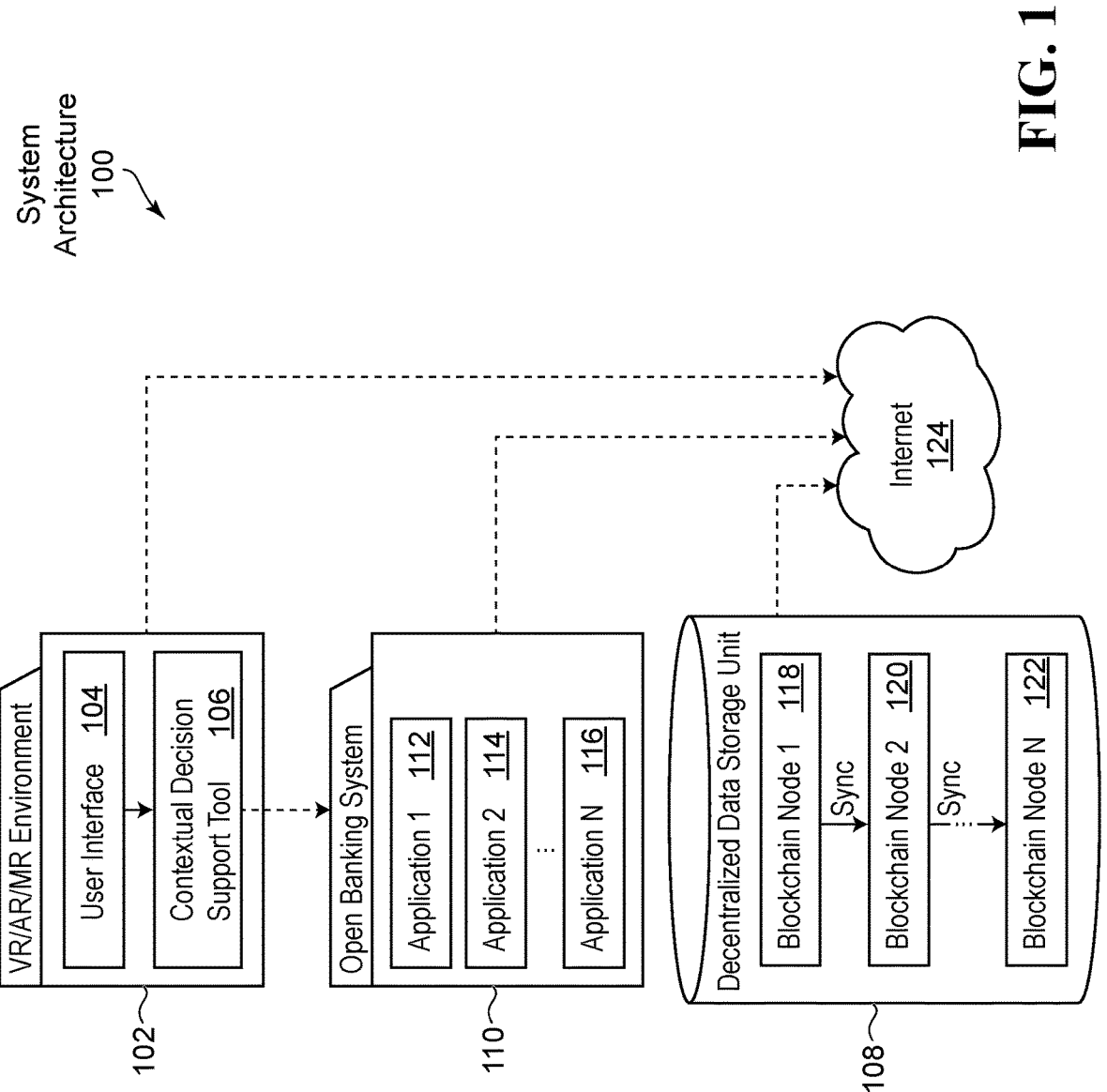
FIG. 1 is a block diagram of a system architecture providing decentralized, open banking, contextual decision support tools in virtual, augmented, and mixed reality environments in accordance with an example of the present specification.

Throughout the following discussion, references may be made regarding devices, servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, DSP, x86, ARM, ColdFire, GPU, multi-core processors, system-on-a-chip, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial or health data query protocols, or other electronic information exchanging methods. Data exchanges can be conducted over a packet-switched network, the Internet, LAN, WAN, VPN, or other type of packet switched network.

The specification is directed to a method and a system for decentralized, open banking, contextual decision support tools in virtual, augmented, and mixed reality environments are provided. According to one example, a wearable electronic device maintains access to a network of decentralized open banking data nodes. After receiving a data operation including contextual data from a plurality of sensors of the wearable electronic device, the device processes the data operation to generate context-aware financial information using industry semantics and updates the display with the results of the data operation and present the context-aware financial information within a zone of the metaverse environment corresponding to a financial category.

One should appreciate that the systems and methods of the inventive subject matter provide various technical effects, including the provision of contextual decision support tools in virtual, augmented, and mixed reality environments.

As used in the present specification, the term "open banking" refers to the use of open APIs that enable third-party developers to build applications and services around one or more financial institutions. This offers greater financial transparency options for account holders. Traditionally, banking services were confined to proprietary systems and limited access to customer data. However, with open banking, financial institutions allow authorized third-party developers to access and utilize customer data securely and with user consent. This enables the development of innovative applications and services that can leverage this data to provide enhanced banking experiences, personalized insights, and convenient financial management tools. By leveraging open APIs, third-party developers can create applications that integrate with a user's financial accounts, enabling them to aggregate data from multiple accounts or institutions into a single platform. This offers customers a view of their financial information, including account balances, transaction histories, and other relevant data. Furthermore, open banking fosters enables third-party developers to introduce financial products and services that were traditionally limited to a specific bank or institution. For example, a third-party app can provide budgeting tools, investment analysis, or personalized financial advice by accessing and analyzing transaction data from multiple accounts. Open banking facilitates secure sharing of data between authorized parties, enabling customers to securely grant access to their financial information to third-party applications they trust, further enhancing transparency and control.

Use of the term "context" encompasses attributes from the wearable electronic device sensors including such attributes such as geo-location, geo-coordinates, time, position, orientation, identity, weather, temperature, pressure, motion (e.g., position in time, speed, velocity, acceleration, jerk, etc.), demographics, value, density, rights, regulations, relationships, resources, news events, or other factors. The inclusion of these contextual attributes enriches the decision-making process within the system by providing a comprehensive understanding of the user's environment and circumstances.

A "decision support tool" referred to in the specification is a software application specifically designed to assist in making determinations, judgments, and defining courses of action. These tools provide users, whether individuals or organizations, with relevant information and insights to support informed decision-making. The decision support tool leverages the contextual data obtained from wearable electronic device sensors to provide tailored recommendations, suggestions, and analyses based on the specific context of the user.

By integrating the contextual attributes derived from wearable electronic device sensors, the decision support tool can offer personalized and timely assistance in various domains. For example, considering geo-location and time, the tool can provide location-based financial advice or alerts when the user is in proximity to a particular financial institution or when time-sensitive financial opportunities arise.

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

FIG. 1 presents an exemplary system architecture diagram that illustrates the components and their interconnections for implementing decentralized, open banking, and contextual decision support tools within virtual reality (VR), augmented reality (AR), and mixed reality (MR) environments. This architecture aligns with the example described in the present patent specification. FIG. 1 includes several interconnected components of the system 100 over network infrastructure 124. VR/AR/MR environment 102 is a package that encapsulates the immersive user interface and contextual decision support tool components. User interface 104 represents the user-facing interface through which individuals interact with the system within the virtual, augmented, or mixed reality environment. Contextual decision support tool 106 assists users in making informed decisions by providing relevant contextual information within the VR/AR/MR environment. Open banking system 110 is a package that encompasses multiple applications that facilitate the functioning of the open banking system. Applications 112, 114, 116 represent the individual applications within the open banking system that provide specific functionalities and services. Decentralized data storage 108, represented as a database, signifies the storage infrastructure for decentralized data. Blockchain nodes 118, 120, and 122 are nodes within the blockchain network, responsible for storing and validating data in a decentralized manner. The user interface 104 is connected to the contextual decision support tool 106 to facilitate interaction and decision-making within the VR/AR/MR environment. The user interface 104 and open banking system 110 are both interconnected with the network 124 to enable communication and data exchange with external entities. The open banking system 110 interacts with the decentralized data storage 108 for secure and decentralized storage and retrieval of banking data. The blockchain nodes 118, 120, and 122 synchronize data between each other to maintain consistency and integrity within the decentralized data storage 108.

According to one example of the present specification, the VR/AR/MR environment 102 can be implemented in a wearable electronic device 130 (not shown in FIG. 1) that is associated with a banking customer. The wearable electronic device 130 generally comprises a processor, a network interface device, a data storage, a number of sensors, as well as a display. In one example, the wearable electronic device 130 can be a head-mounted device that provides virtual reality for the user, later referred to as VR headset 300. VR headsets 300 are used with video games but are also used in other applications, including simulators and trainers. Typically, they comprise a stereoscopic head-mounted display (providing separate images for each eye), stereo sound, and head-motion-tracking sensors, which may include devices such as gyroscopes, accelerometers, magnetometers, or structured light systems. Some VR headsets (also referred to as displays) also have eye-tracking sensors and gaming controllers. The VR glasses use a technology called head-tracking, which changes the field of vision as a person turns their head.

Figure 2:
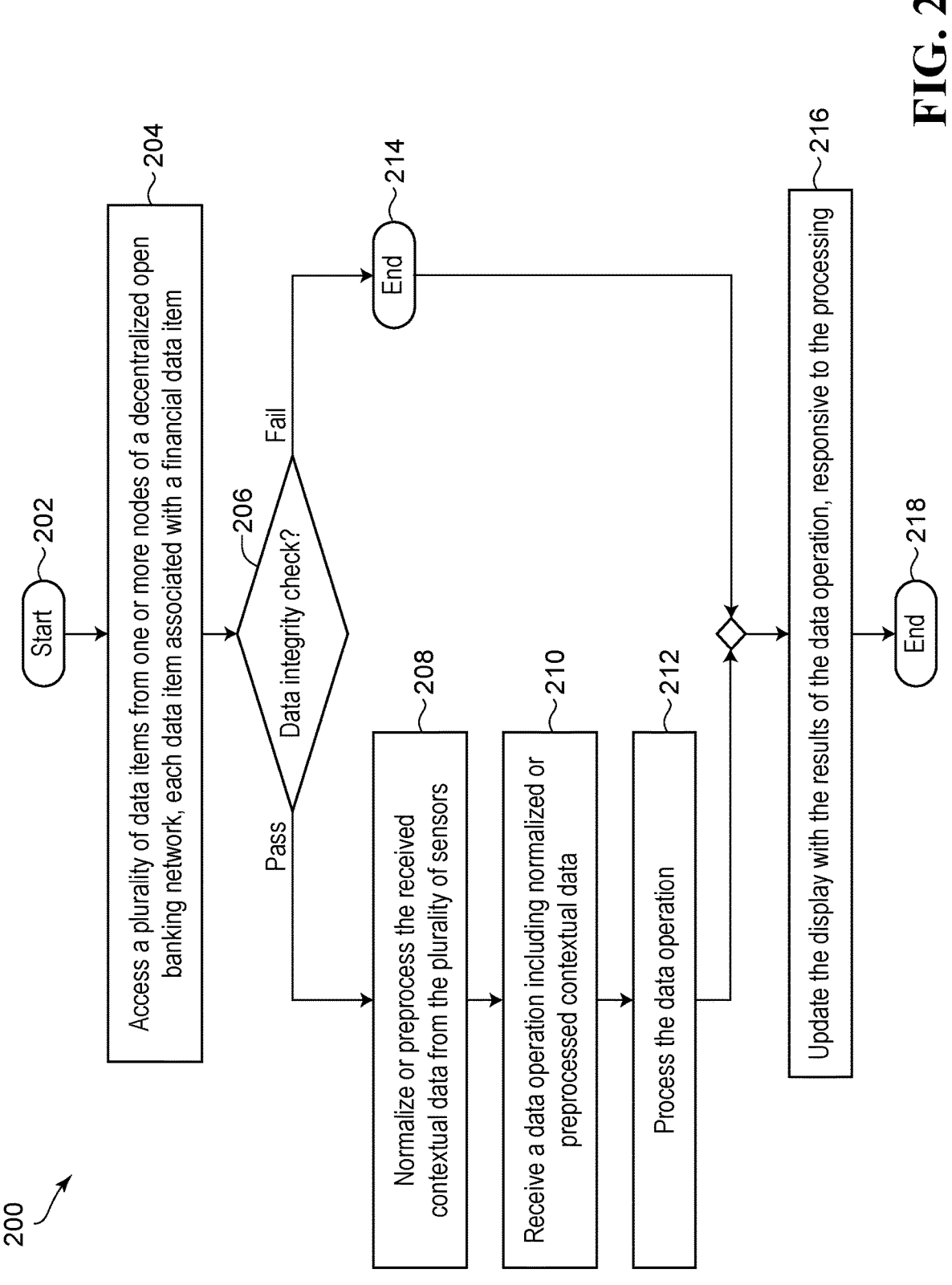
FIG. 2 is a flowchart illustrating a method for implementing decentralized, open banking, contextual decision support tools in virtual, augmented, and mixed reality environments, as described in the example of the present specification.

FIG. 2 represents an exemplary flowchart illustrating the method for implementing decentralized, open banking, and contextual decision support tools within a virtual reality (VR), augmented reality (AR), or mixed reality (MR) environment. The flowchart consists of the following steps: The method begins at 202. At 204, a server accesses a plurality of data items from one or more nodes of a decentralized open banking network. In this step, the method retrieves multiple data items associated with financial data from the decentralized open banking network. These data items may include transaction records, account information, or other relevant banking data. At 206, the integrity of the received data items is checked. If the data integrity check passes, the method proceeds to the next steps; otherwise, it terminates at 214. At 208, if the data integrity check is successful, the method normalizes or preprocesses the contextual data obtained from various sensors. These sensors may capture user movements, gestures, or other contextual information within the VR/AR/MR environment. At 210, the method receives a data operation that includes the normalized or preprocessed contextual data. This data operation can be a user input, such as a gesture or voice command, or an automated event triggered by the system. At 212, the method processes the received data operation, incorporating the normalized or preprocessed contextual data. This processing can involve analyzing the data, performing calculations, or executing specific banking operations based on the provided input. At 216, once the data operation is processed, the method updates the display to present the results of the operation. This may involve visualizing financial information, providing notifications, or displaying interactive elements within the VR/AR/MR environment. The method concludes at 218.

While the system and method described in FIG. 1 and FIG. 2 provide a detailed embodiment of decentralized, open banking, and contextual decision support tools within VR/AR/MR environments, it should be noted that various modifications and variations are intended to be included within the scope of the present specification, including the following:

1. While the method described includes processing the received contextual data, variations can introduce more advanced data analytics techniques. This can involve the application of machine learning algorithms, artificial intelligence, or natural language processing to extract insights from the collected data. By incorporating these analytics capabilities, the system can provide more accurate and personalized recommendations, identify patterns and trends, and enable predictive analysis for financial decision-making.

2. The system and method can be extended to integrate with external services and APIs, expanding the functionalities and data sources available to users. For instance, integrating with financial data providers or third-party applications can enable real-time access to market data, personalized financial advice, or integration with other banking or investment platforms. This integration allows for a more interconnected banking experience within the VR/AR/MR environment.

3. While the system and method described are primarily focused on VR/AR/MR environments, variations can be implemented to ensure compatibility with multiple platforms and devices. This can include adapting the system to work with traditional desktop or mobile interfaces, enabling users to access and interact with the system across different devices and form factors. By offering multi-platform compatibility, the system can reach a broader user base and accommodate diverse user preferences and accessibility requirements.

4. Depending on the specific implementation and regulatory considerations, variations can introduce additional security and privacy measures to safeguard sensitive financial data. This can involve incorporating robust encryption techniques, implementing user authentication and authorization mechanisms, or complying with specific data protection regulations. By addressing security and privacy concerns, the system can enhance user trust and confidence in utilizing decentralized, open banking services within the VR/AR/MR environment.

It should be understood that these variations are merely examples, and numerous other modifications and enhancements are possible within the scope of the disclosed system and method. The system and method can be customized, optimized, or expanded to suit specific user requirements, technological advancements, or regulatory frameworks. Such variations allow for a flexible and adaptable solution in decentralized, open banking in virtual, augmented, and mixed reality environments.

Figure 3:
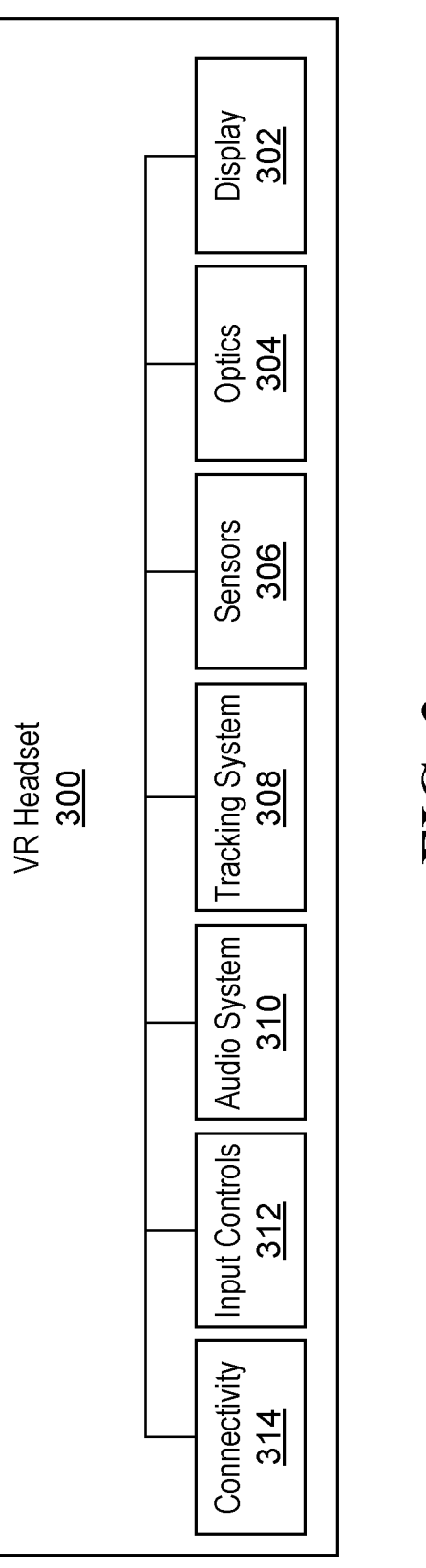
FIG. 3 is a block diagram of a VR headset in accordance with an example of the present specification for use with the system of FIG. 1.

FIG. 3 presents a visual representation of a VR headset 300 equipped with various essential technology components, according to one example of the present specification. The headset 300 serves as the central device for delivering an immersive virtual reality experience. VR headset 300 includes display 300, a high-resolution OLED or LCD screen, optics 304 which magnify and focus the display, enabling a wide field of view and enhancing the sense of depth in the virtual environment. VR headset 300 also includes sensors 306 including accelerometers, gyroscopes, and magnetometers, that track the position and movement of the user's head, facilitating realistic and responsive virtual world interaction. VR headset 300 may also includes a tracking system 308 which may employ infrared sensors, cameras, or laser-based technologies, to monitor the user's complete body movements within the virtual space. Audio system 310 includes integrated or detachable headphones or speakers that provide spatial audio, offering realistic 3D soundscapes corresponding to the virtual environment. The VR headset 300 incorporates input controls 312, ranging from handheld controllers with buttons, triggers, and joysticks to advanced solutions like hand tracking or haptic gloves. Input controls 312 enable users to interact with virtual objects, navigate menus, and perform actions within the VR environment. The VR headset 300 establishes connectivity 314, either wired (e.g., HDMI, USB) or wireless (e.g., Wi-Fi, Bluetooth), to a computer or game console, providing the necessary processing and rendering capabilities for the virtual reality experience.

FIG. 4 through FIG. 15 illustrate screenshots of a user application in accordance with examples of the present specification.

Figure 4:
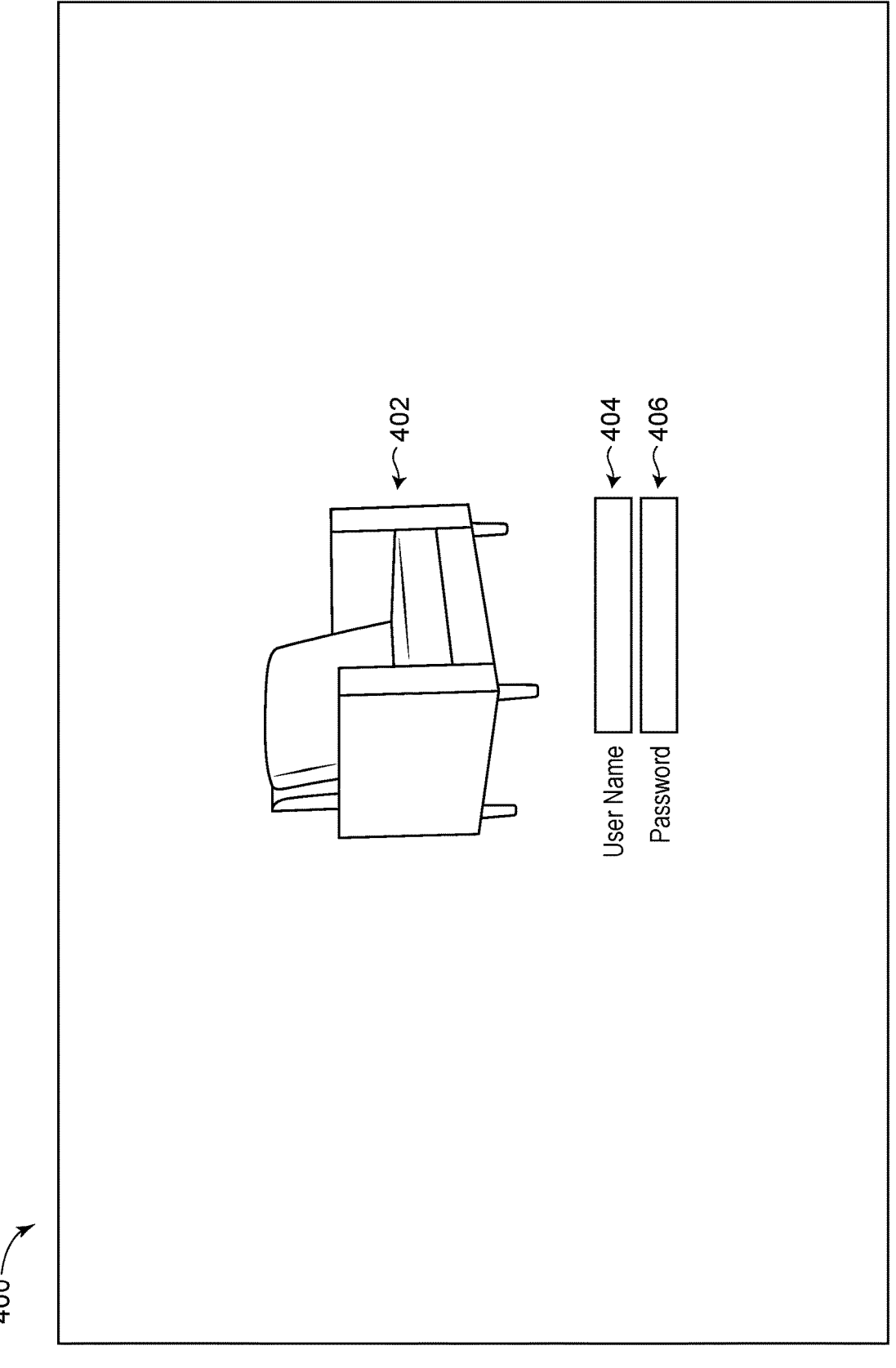
FIG. 4 to FIG. 15 are views of application screenshots of a user interface for decentralized, open banking, contextual decision support tools in virtual, augmented, and mixed reality environments in accordance with an example of the present specification.

FIG. 4 illustrates a screenshot 400 from the user's perspective of the initial login page within the virtual environment. The depicted environment resembles a virtual living space, with an example of a piece of furniture such as a virtual couch 402 rendered within the scene for added immersion. The login interface prominently features fields for entry of a user name 404 and password 406, both components for securing and personalizing the user's experience.

Figure 5:
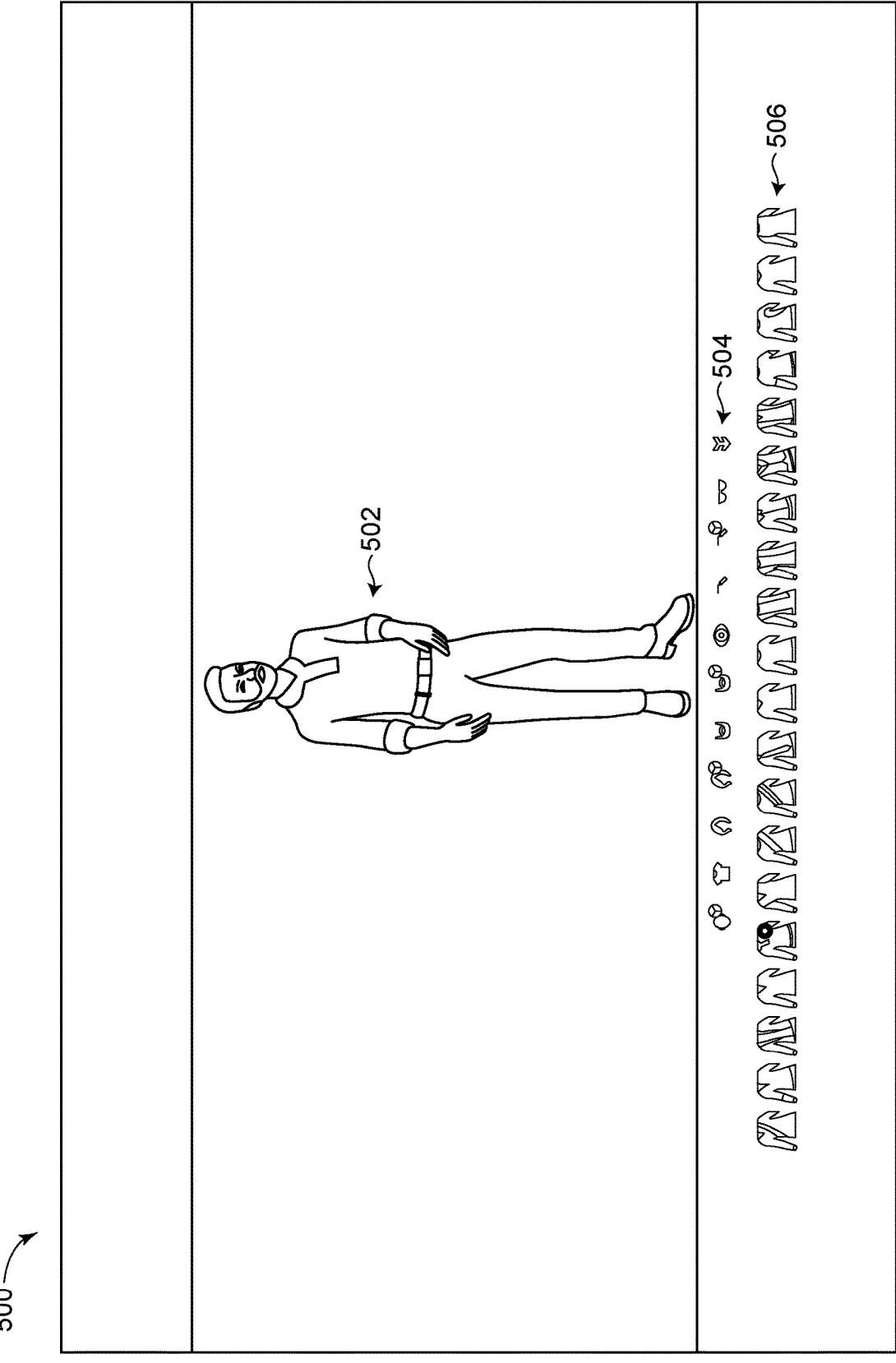

FIG. 5 illustrates a screenshot 500 showcasing an avatar customization interface within the metaverse environment. The user's avatar 502 is displayed centrally, serving as a real-time visual reference for the customization process. The interface features two interactive ribbons: a feature ribbon 504 and a costume ribbon 506. The feature ribbon 504 allows users to customize various facial and body characteristics of the avatar, such as eyes, hair, accessories, skin tone, ears, and so forth. The costume ribbon 506 provides a selection of different outfits or costumes that can be applied to the avatar, enabling users to personalize the avatar's appearance further.

Figure 6:
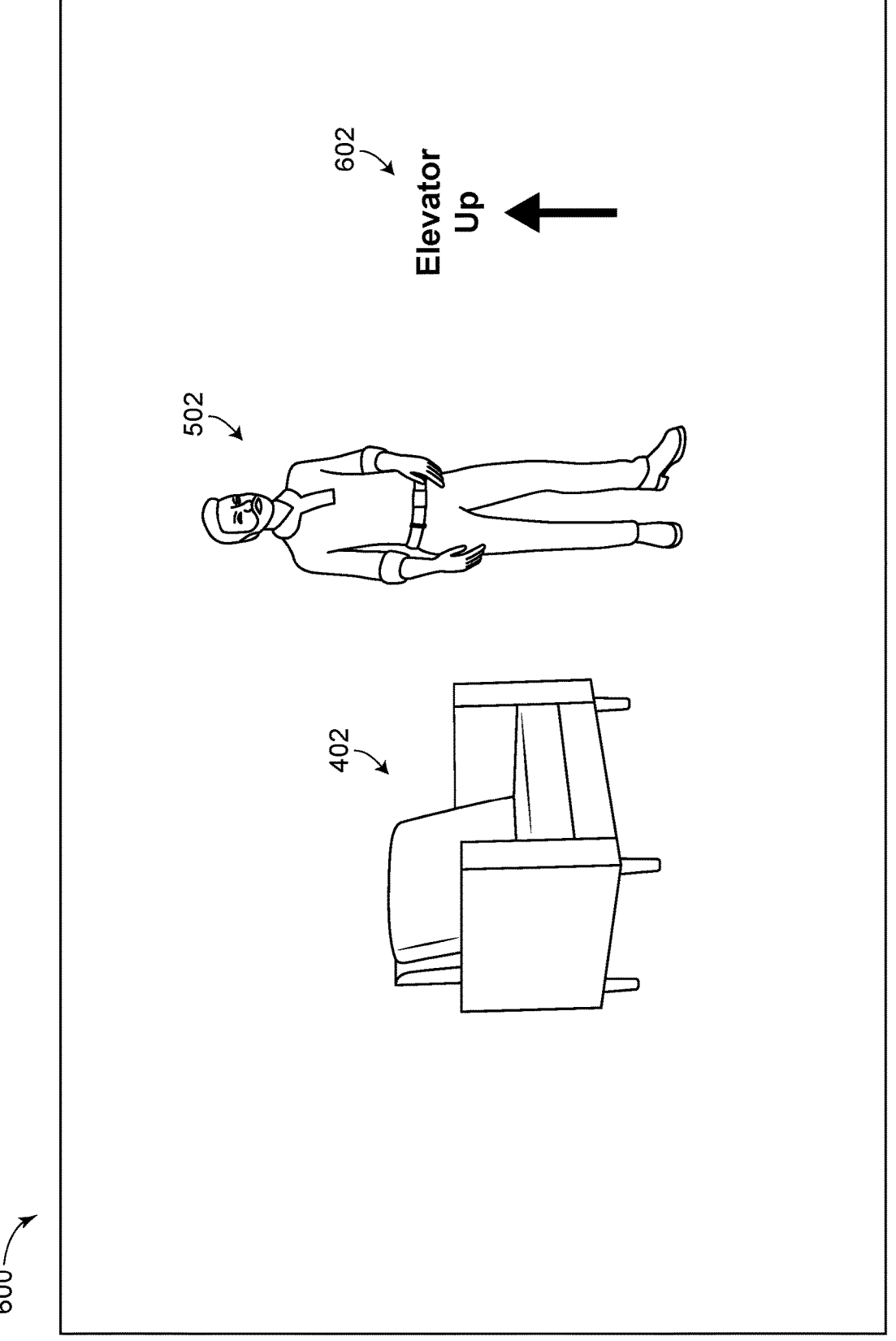

FIG. 6, illustrates a screenshot 600 of the metaverse environment featuring the personalized avatar 502 in a virtual room. The avatar is positioned next to a piece of virtual furniture, specifically couch 402, establishing a casual environment. Prominently featured in the scene is an elevator 602 (denoted by the words elevator up), which signifies the gateway to an upper level or room where the user's financial information will be displayed. The juxtaposition of everyday elements like the couch and the elevator with the avatar within this virtual setting suggests a blend of familiar real-world environment and the digital metaverse.

Figure 7:
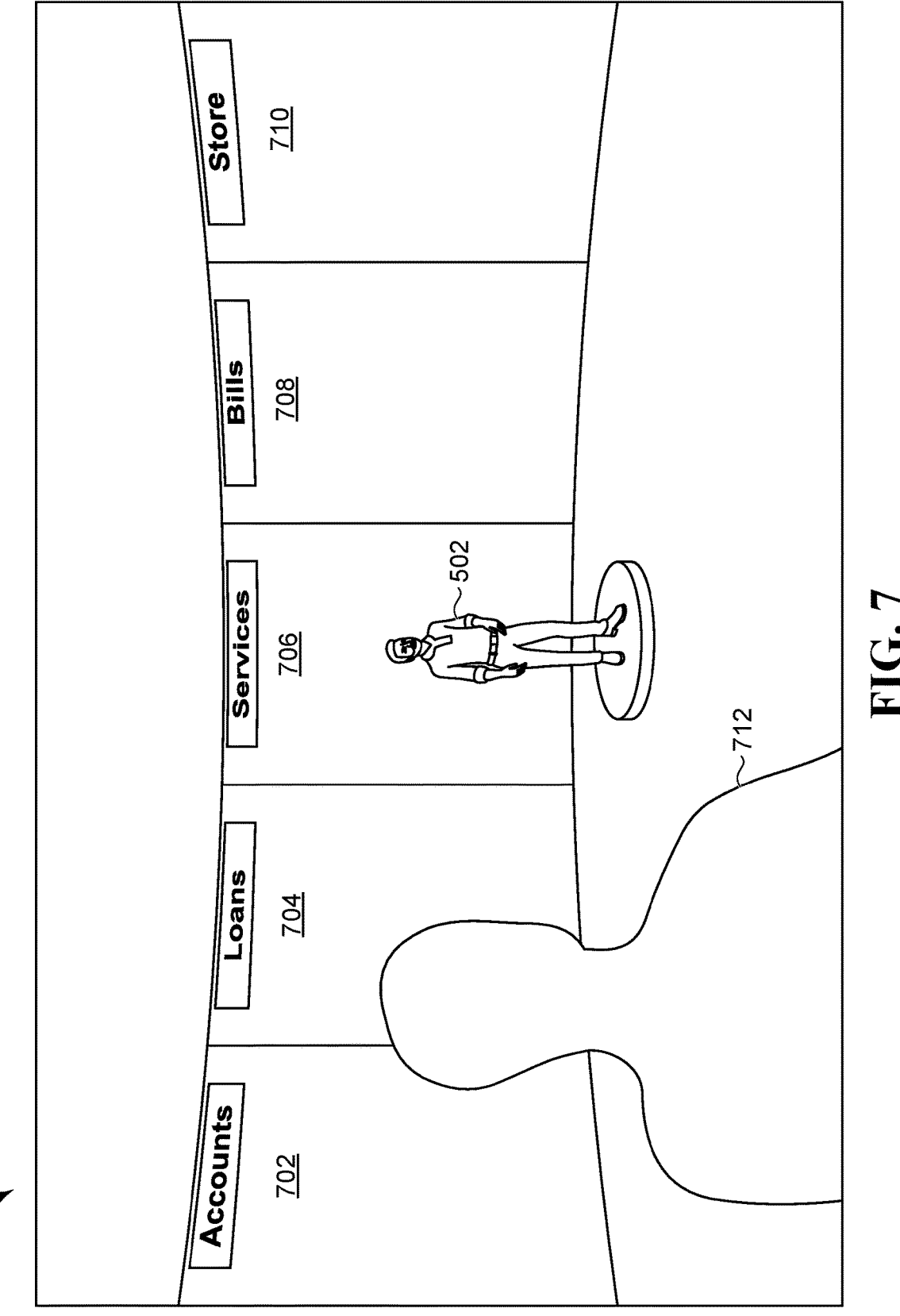

FIG. 7 illustrates a screenshot 700 of the main menu screen of the immersive banking metaverse. The screenshot 700 portrays a silhouette of the user 702 in the foreground, implying the user's virtual presence within the environment. The middle ground features the previously created avatar 502, acting as a representative of the user within the metaverse. The main aspect of this screenshot is a series of large interactive windows or menu items, seemingly floating in the virtual space. These menu items correspond to various financial categories: "Accounts" 702, "Loans" 704, "Services" 706, "Bills" 708, and "Store" 710. Each category can be selected by the user for interaction and management of respective financial data, presenting a user-centric, engaging, and intuitive interface for the financial metaverse.

Figure 8:
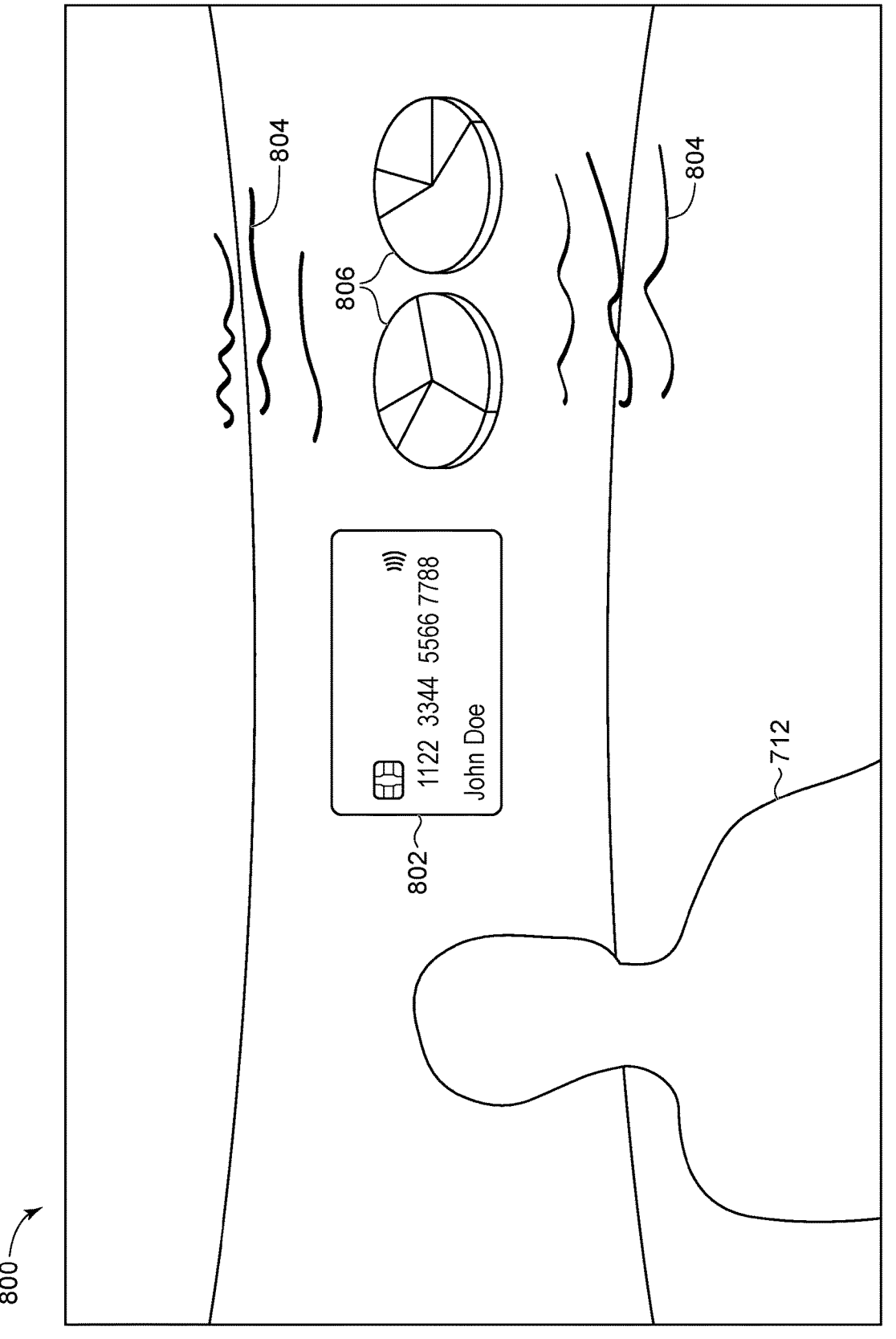

FIG. 8 illustrates a screenshot 800 which portrays the metaverse environment once the user selects "Accounts" 702 from the main menu. A visual representation of a credit card 802 appears to be floating within the space, indicating the chosen financial category. Screenshot 800 illustrates the immersive and graphical nature of the platform. Alongside the credit card 802, the screen displays rich financial information 804 and interactive graphics 806. The financial information 804 may include detailed data about the user's credit card usage, balances, due dates, and other pertinent details. Simultaneously, the interactive graphics 806 provide insightful visualizations such as card spending trends, pie charts reflecting spending categorization, and personalized recommendations based on the user's spending habits. This visualization facilitates a personalized, and interactive understanding of the user's financial situation within the "Accounts" category.

Figure 9:
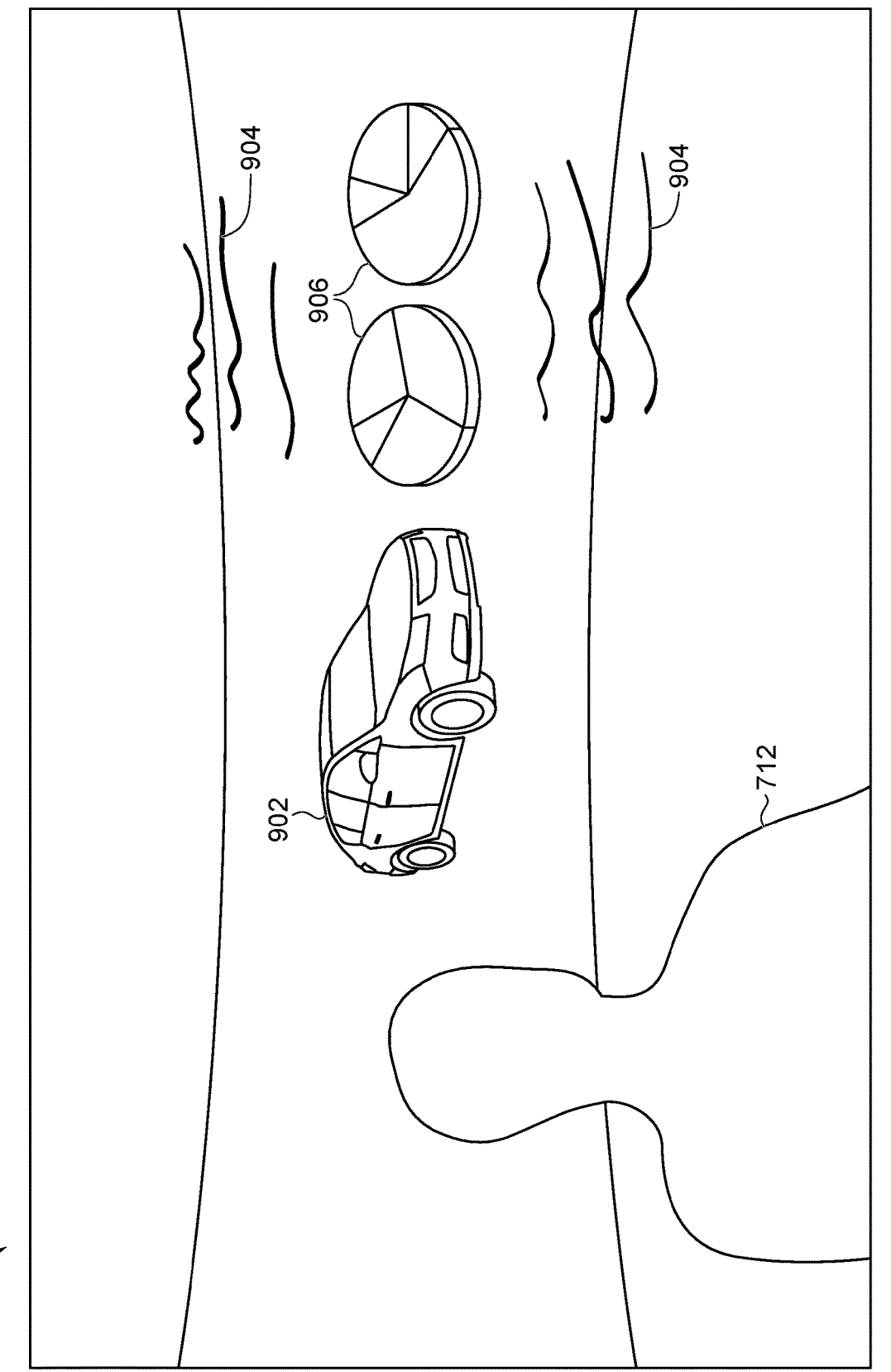

FIG. 9 illustrates a screenshot 900 which portrays the metaverse environment once the user selects "Loans" 704 from the main menu. The user's car 902, or a representative model thereof, is prominently displayed, seemingly floating within the immersive metaverse environment. Similar to screenshot 800, this view incorporates rich, contextualized financial information 904, visually aligned with the selected category. This information includes details about the user's car loan, payment schedules, interest rates, remaining balance, and other relevant data. Complementing the detailed data, pie charts 906 provide a visual breakdown of car-related expenditures, such as loan repayment, fuel, maintenance, insurance, and other costs. This composite view offers an enhanced understanding of the user's financial commitments associated with their vehicle, promoting better financial decision-making.

Figure 10:
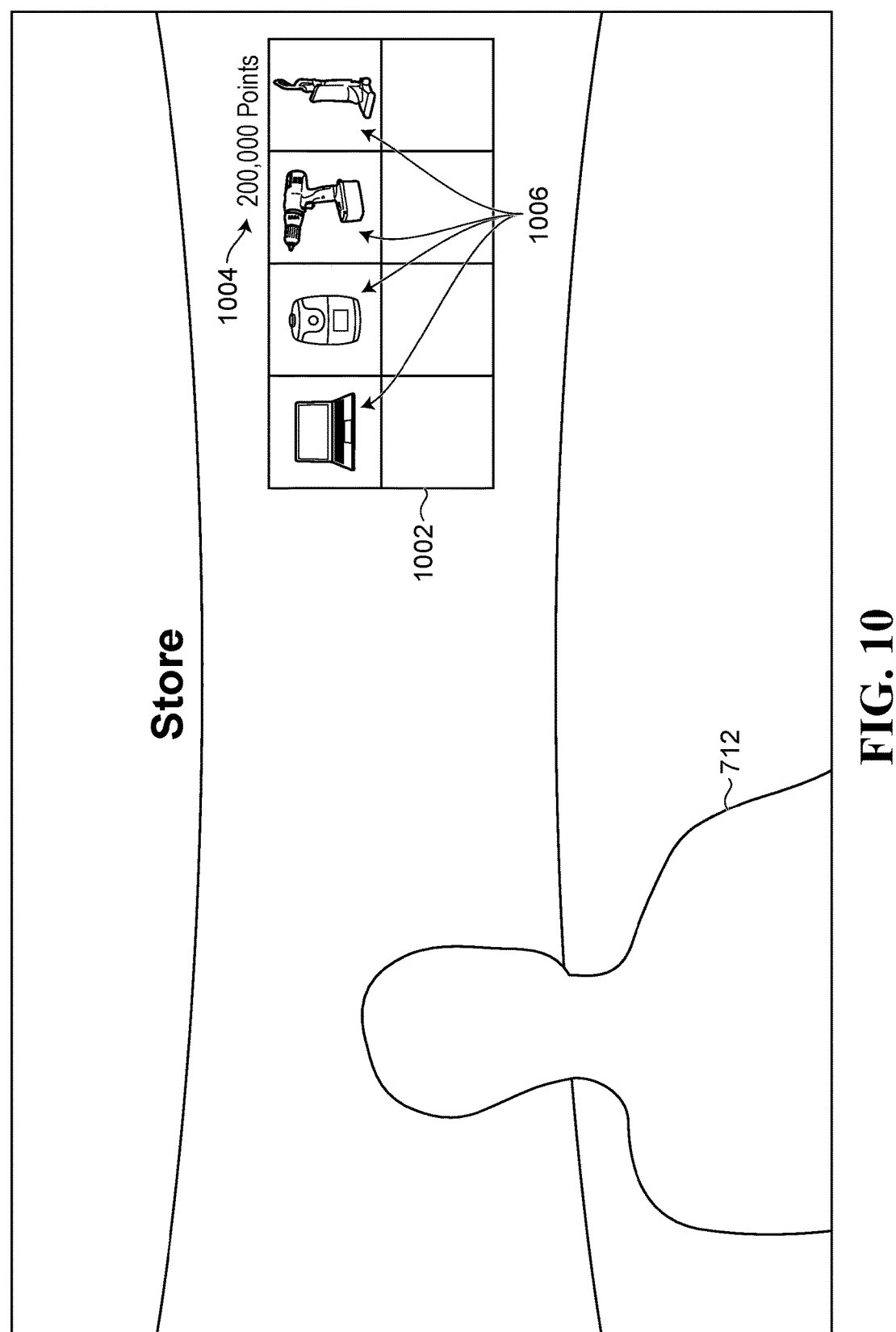

FIG. 10 illustrates a screenshot 1000, which portrays the metaverse environment once the user selects "Store" 710 from the main menu. This interactive space presents the user with a range of reward options they can redeem using accumulated points or digital currency. A display of the user's balance 1004 is located within the viewer's sightline, enabling real-time tracking of available points or currency for redemption. A user-friendly table 1002 is also visible, showcasing a variety of reward options 1006. The options illustrated in this scenario include items like a laptop, cooker, drill, and vacuum, each linked to a specified points value. This screenshot offers an immersive and engaging way for users to explore their rewards and make informed decisions on redeeming their accumulated points or currency.

Figure 11:
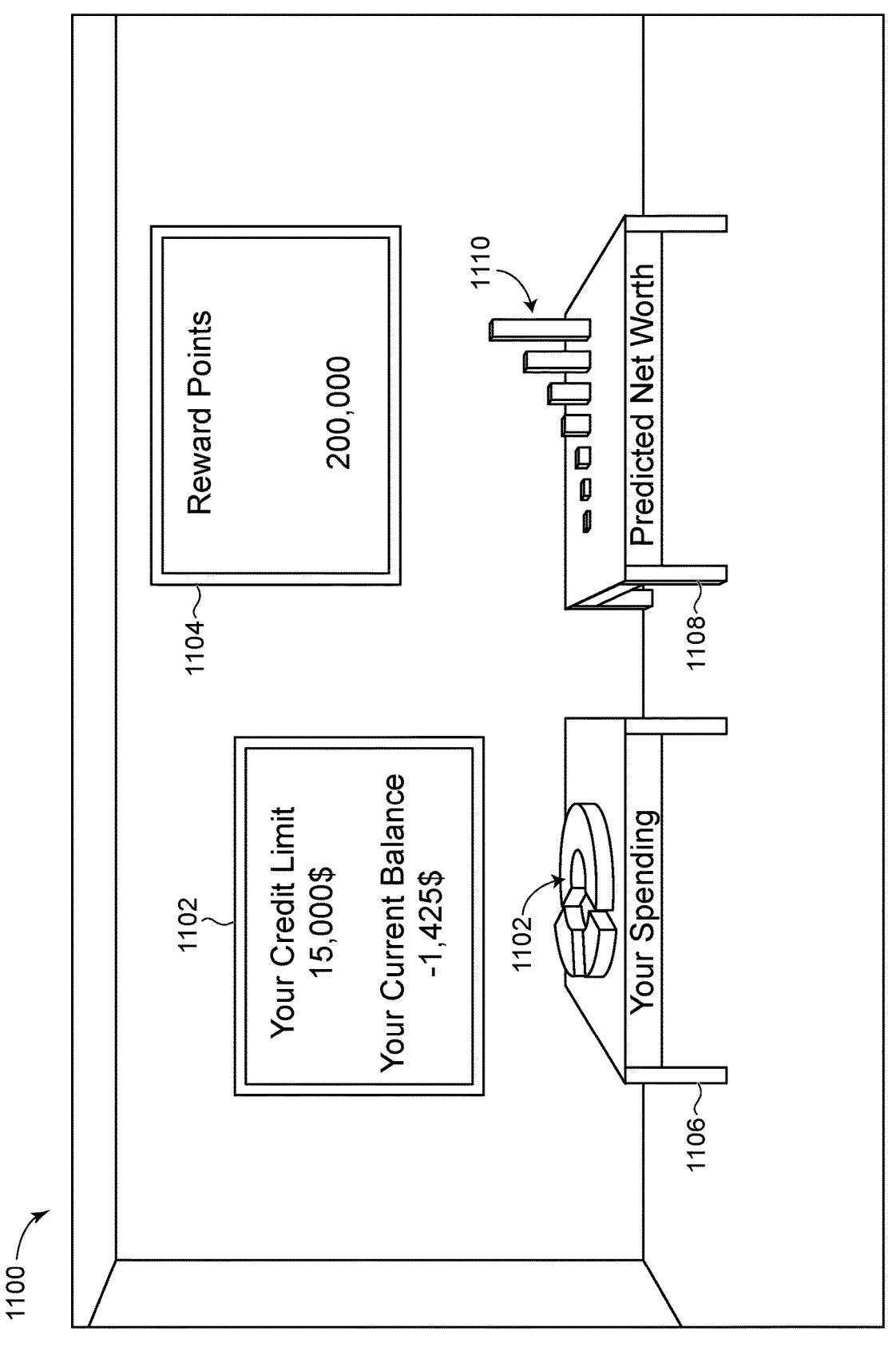

FIG. 11 illustrates a screenshot of a metaverse environment styled as a living room. This immersive setting incorporates both real-world and virtual elements, providing users with a familiar yet enhanced experience. The environment is richly textured, and includes items of furniture such as coffee tables 1106 and 1108, creating an atmosphere that is akin to a real living room. The scene integrates financial information into the decor, with paintings 1102 and 1104 doubling as displays for financial metrics. Painting 1102 displays the user's credit limit and balance, while painting 1104 showcases the user's reward points, providing easy, at-a-glance views of these financial figures. Notably, the coffee tables in the scene have been utilized as interactive, 3D data visualization platforms. Coffee table 1106 supports a 3D pie chart illustrating the categorization of expenses on the user's credit card, while coffee table 1108 hosts a bar chart demonstrating the user's increasing net worth, whether a real figure or a projection. This display of financial information in a home-like environment exemplifies the immersive and intuitive nature of the metaverse experience.

Figure 12:
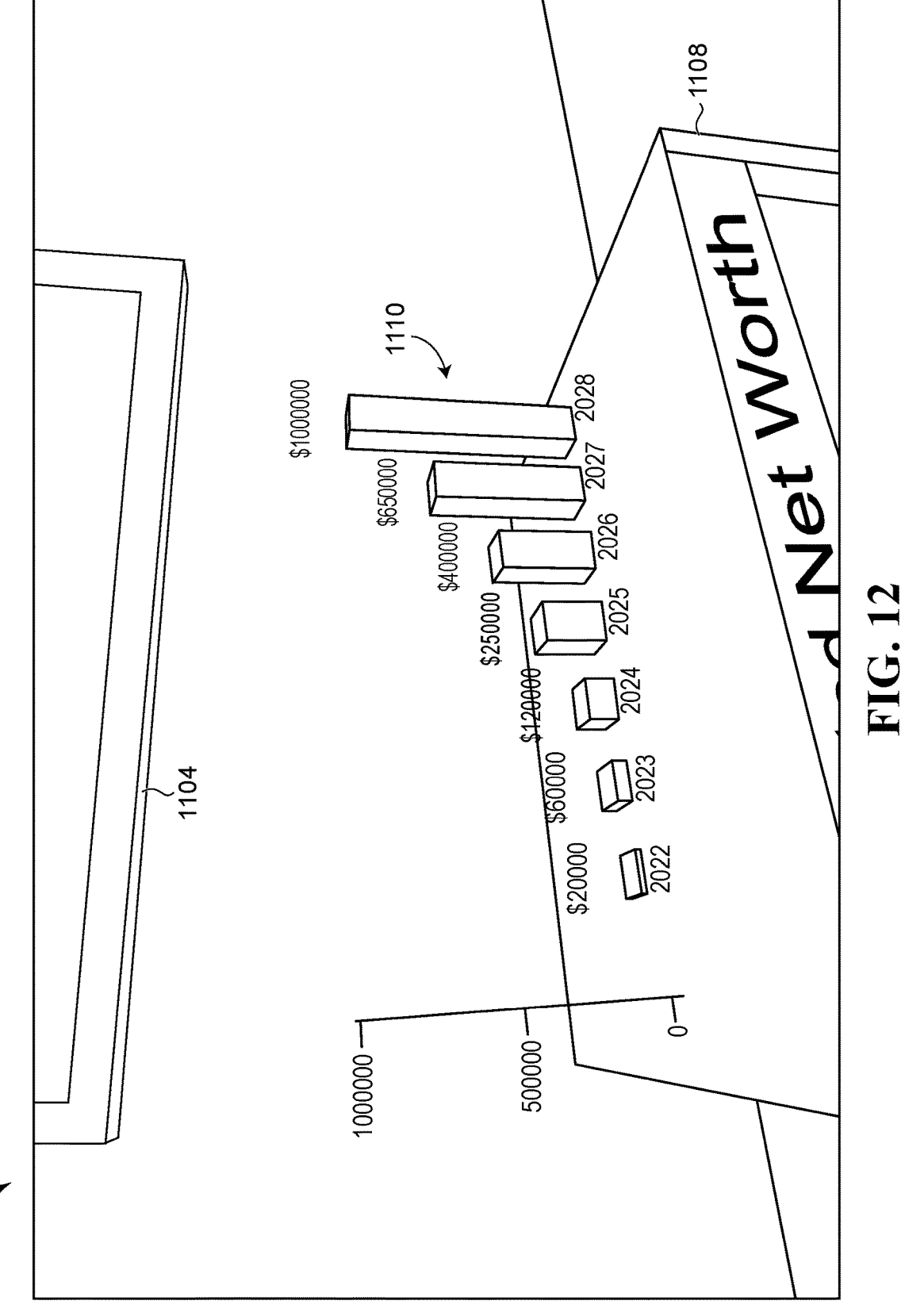

FIG. 12 illustrates a closer view of the environment previously seen in FIG. 11 with a focused perspective on coffee table 1108. This screenshot 1200 allows for a more detailed examination of the financial information embedded into the metaverse environment. Here, a bar chart 1110 is seen resting on the coffee table 1108, now clearly visible in this zoomed-in view. The bar chart 1110 provides a visual representation of the user's net worth, delineated by individual bars representing different time periods or financial categories. The zoomed perspective in FIG. 12 highlights the interactive and accessible nature of financial data representation in this metaverse environment.

Figure 13:
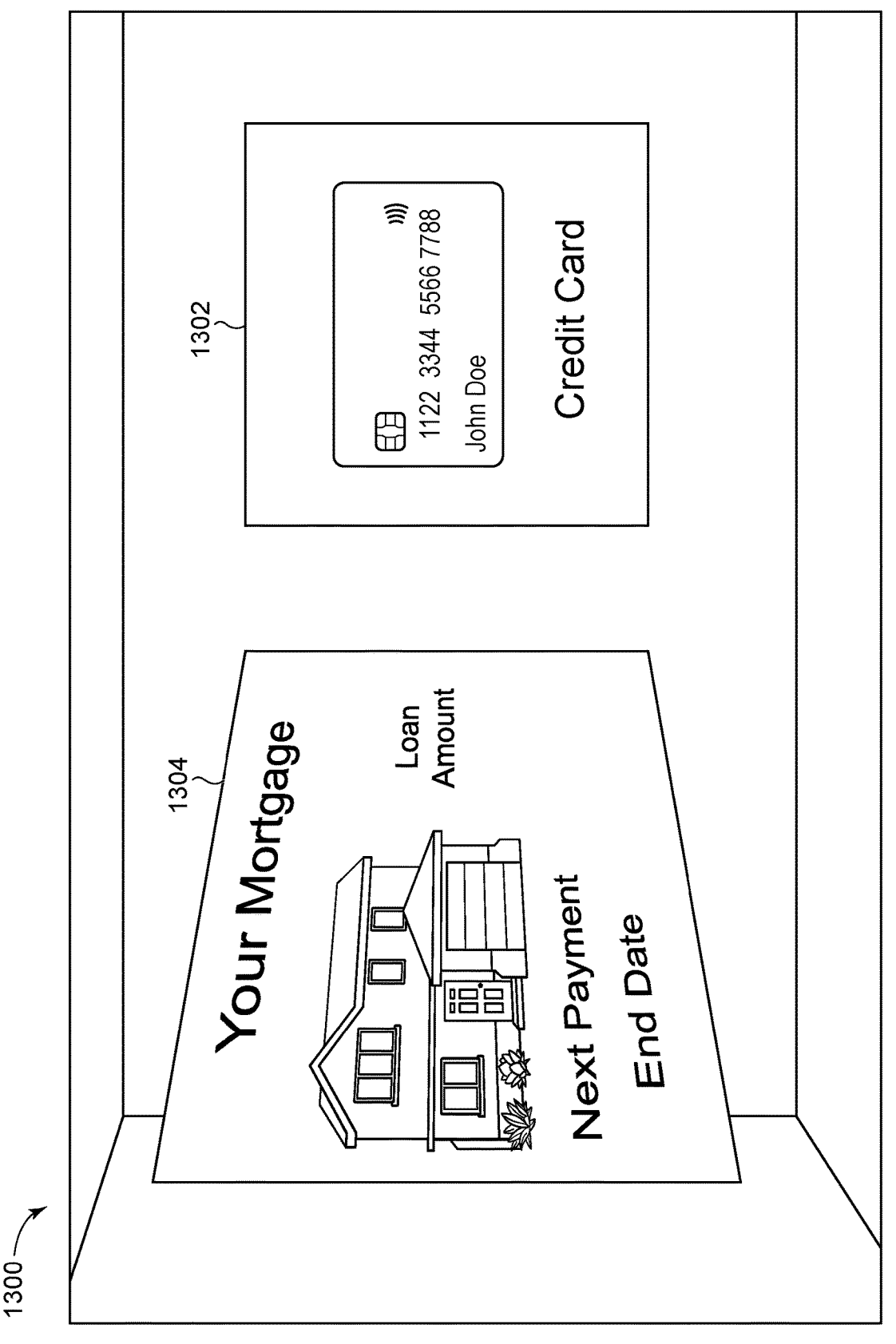

In FIG. 13, the same living room environment with textured wallpaper, which is not explicitly depicted in the figure, continues to provide the setting for the interaction. Screenshot 1300 displays two floating windows, 1302 and 1304, seamlessly integrated within the spatial context of the room. Window 1302 showcases a floating representation of a credit card, serving as a dynamic visual metaphor for the user's credit account. Window 1304 provides a snapshot of the user's housing mortgage or loan, featuring a pictorial representation of a house, accompanied by vital loan parameters such as the total loan amount, upcoming payment due, and the end date of the loan. This augmented reality display system is designed to blend naturally with the room's environment, thus maintaining the immersive and intuitive experience within the metaverse.

Figure 14:
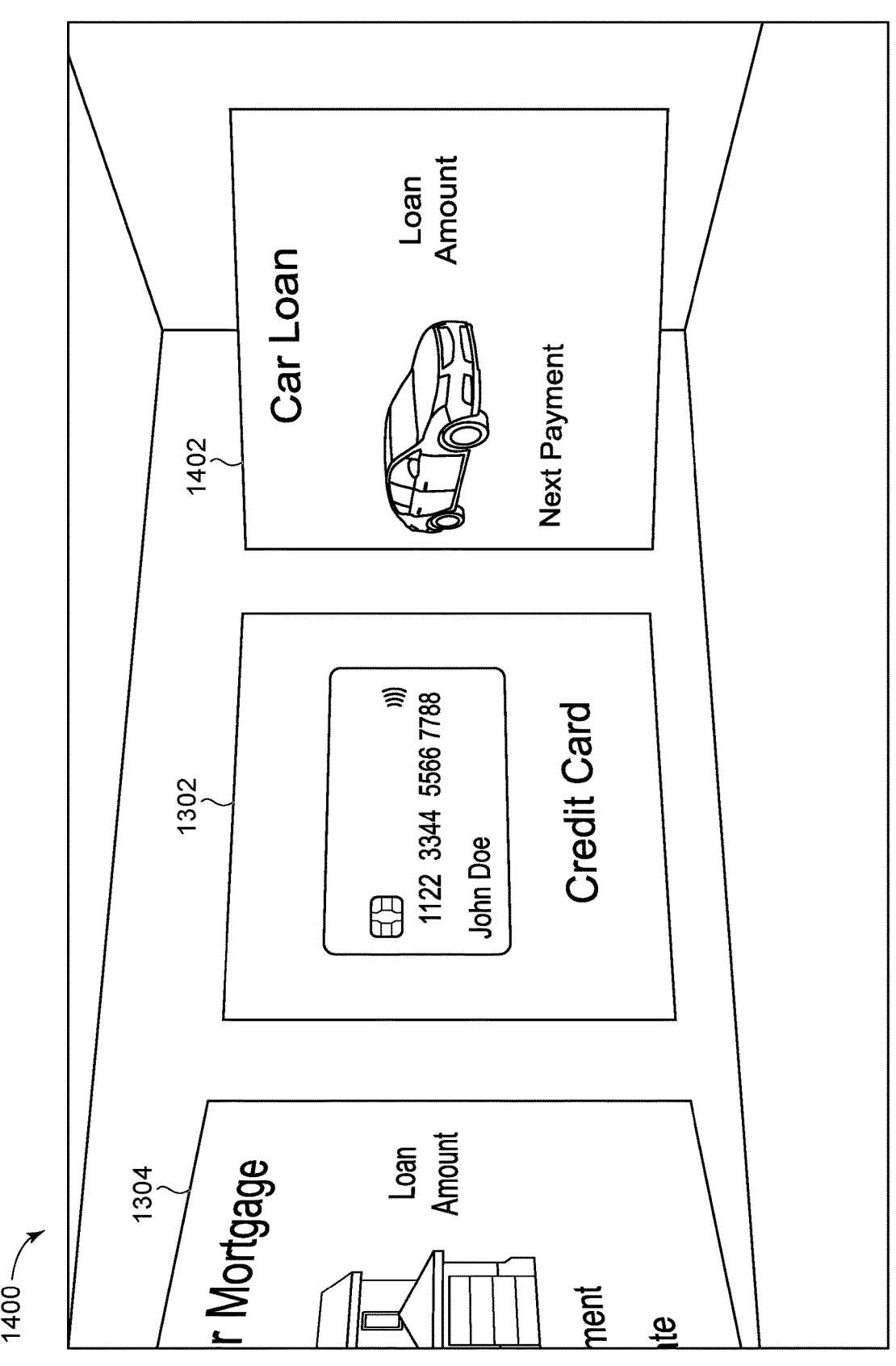

In FIG. 14, screenshot 1400 captures the dynamism of the metaverse environment as the user shifts their perspective to the right. This movement triggers the appearance of a new interactive window, 1402, dedicated to the user's car loan information. The window graphically represents a car, accompanied by corresponding financial details about the car loan. Simultaneously, windows 1302 and 1304 remain visible, creating a sense of depth and perspective within the 3D environment. The credit card representation in window 1302 remains centrally positioned, while the housing loan information in window 1304 is partially visible to the left, thus reflecting the user's change in viewpoint. This interactive arrangement offers the user a seamless, immersive navigation experience through their financial data within the metaverse.

Figure 15:
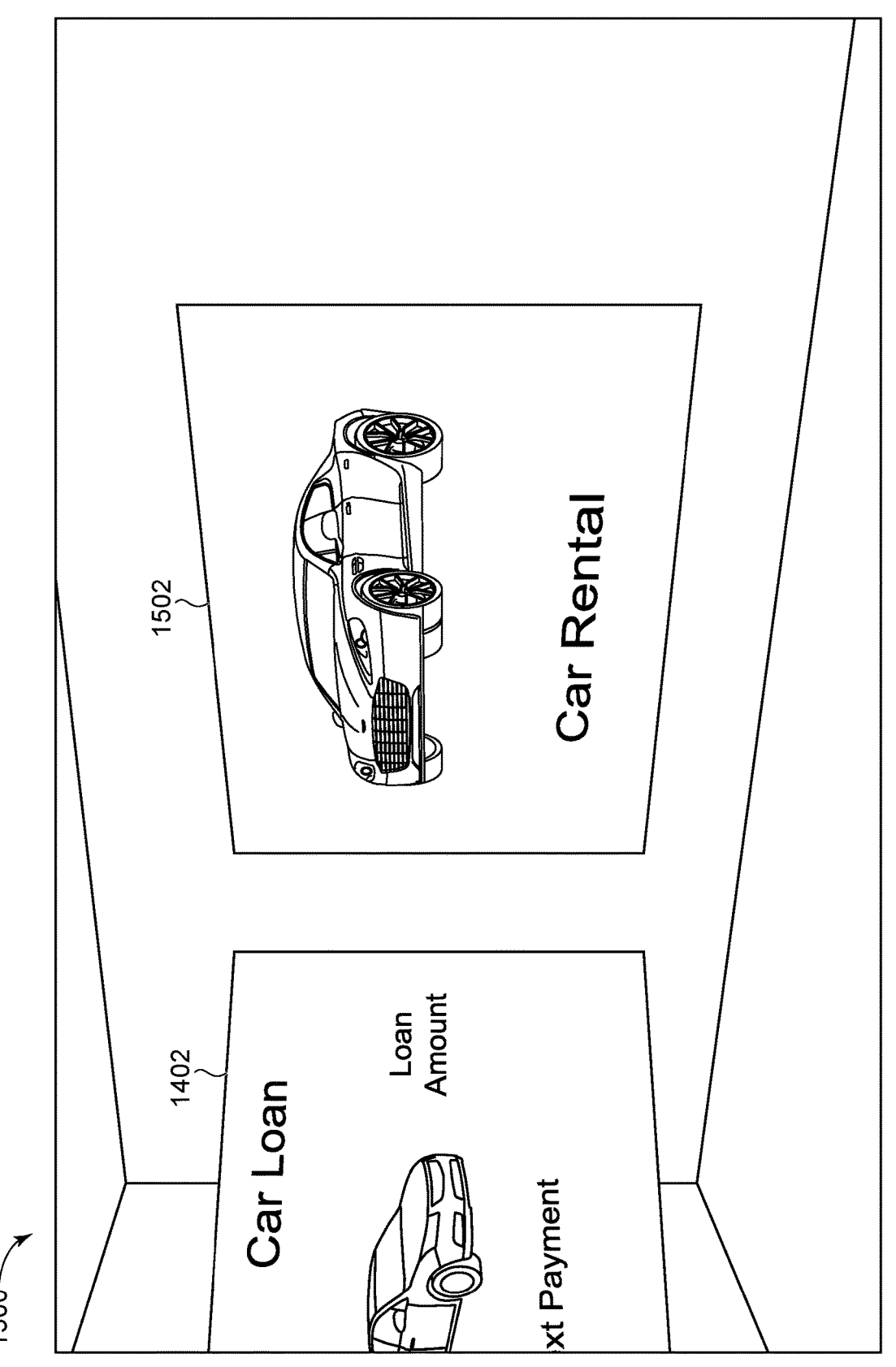

In FIG. 15, depicted as screenshot 1500, the user continues their exploration of the metaverse environment by shifting their perspective further to the right. This maneuver brings forth a new interactive tile or window, labelled 1502. This new window is positioned beside the previously visible car loan information in tile 1402, offering additional financial information or features for user interaction. This new tile 1502 provides details on car rental options, including availability, pricing, and any related offers, thus demonstrating the platform's capacity to provide comprehensive financial services information. As the user's focus has shifted rightwards, tiles 1304 and 1302, which respectively represented housing loan and credit card information, have moved out of view. This continual, user-directed movement and presentation of information within the metaverse exemplify the immersive and fluid navigation experience it offers.

In addition to the scenarios exemplified by the drawings, further scenarios will be described that illustrate different banking transactions within the context of decentralized, open banking and contextual decision support tools in VR/AR/MR environments:

Account Balance Inquiry

When the user wearing the VR headset enters the virtual environment, they find themselves standing in their personalized living room. By moving their hand or speaking a voice command, they open an interactive window, as seen in FIG. 7. The window then presents their current account balance, recent transactions, and personalized spending insights. This could appear as a 3D holographic data visualization hovering above a coffee table, like the credit card expenses categorization shown in FIG. 11.

Fund Transfer

To initiate a fund transfer, the user could gesture towards or voice-command the action of transferring funds. This would prompt a new interactive window to open, displaying a secure transaction confirmation interface with real-time exchange rates and necessary authentication prompts. This could be visualized as seen in FIG. 13, where information hovers in windows, providing an engaging and secure space for the transaction.

Investment Portfolio Management

When managing their investment portfolio, the user could open a window or tile, similar to FIG. 8, which would display interactive 3D charts and graphs representing their portfolio. Personalized recommendations based on market trends and user's financial goals would be shown, enabling informed decisions to be made right in their virtual living room.

Loan Application and Approval

The user could enter a section of the room dedicated to loan applications. They would interact with virtual banking representatives, possibly presented as avatars. The user could access a window similar to FIG. 14, displaying loan terms, interest rates, and repayment options in real-time. Once the application is submitted, approval could be received in a similar immersive, intuitive way.

Personalized Financial Education

The virtual living room could include an education hub where the user could engage with interactive modules and simulations that teach various financial concepts. This could be represented in a way similar to FIG. 10, with a table of options shown, each leading to a different learning experience.

A number of third-party functionality can be integrated into the living room model, delivering personalized product recommendations through interactive tiles or windows, providing immersive financial education experiences, organizing virtual banking events and rewards that could be presented as new items in the room, facilitating virtual financial consultations, and offering interactive product demos. For instance, the product demos could be displayed on paintings or interactive windows like those shown in FIGS. 11 and 13.

While the described system often uses a living room model for clarity, its application is not confined to this setting. The technology's versatility allows it to be used in various VR/AR/MR environments, including but not limited to virtual bank branches, educational hubs, stock exchange simulations, relaxing natural settings, and collaborative business spaces. The choice of environment can be tailored to the user's needs, transaction requirements, or personal preferences, reflecting the adaptable nature of this inventive system.

Advantageously, the combination of decentralized open banking, virtual reality (VR), augmented reality (AR), and mixed reality (MR) technologies forms a novel ecosystem that elevates the conventional banking experience. This approach places users within an immersive virtual world where they can interact with their financial data in an engaging and intuitive manner. Within this environment, financial information is not merely presented but is experienced, fostering an innovative approach to financial management. The incorporation of contextual decision support tools further refines this experience. These tools provide personalized insights and recommendations tailored to individual users, formulated from real-time data analysis and user preferences. Such personalized guidance can enable users to make more informed decisions, transforming a traditionally static interaction into a dynamic exchange. Furthermore, the integration of blockchain technology ensures the secure and decentralized storage of financial data, establishing an atmosphere of transparency, integrity, and trust within the banking ecosystem. This approach empowers users by giving them control and visibility over their financial transactions, thus fostering a more profound connection between banks and their customers. The combination of VR/AR/MR environments, open banking, and contextual decision support tools necessitates an intricate understanding of each domain, offering a revolutionary approach to banking that disrupts conventional practices and enhances user experience significantly. This integration presents a new paradigm for users to engage with their financial data, make informed decisions, and interact with their banks in a highly immersive and personalized manner.

One general aspect includes a method for providing a decentralized, open banking, contextual decision support tools in virtual, augmented, and mixed reality environments. According to one example, a wearable electronic device maintains access to a network of decentralized open banking data nodes. After receiving a data operation including contextual data from a plurality of sensors of the wearable electronic device, the device processes the data operation to generate context-aware financial information using industry semantics and updates the display with the results of the data operation. The display presents the context-aware financial information within a zone of the metaverse environment corresponding to a financial category.

The method can be executed on various types of wearable electronic devices, including a virtual reality headset, an augmented reality headset, a mixed reality headset, or even a smartphone, tablet, or smartwatch. In the latter case, the device's display screen is configured to display a 3D simulation of the metaverse environment.

The method can involve templatizing the metaverse environment into different zones, each corresponding to a different financial category such as credit cards, loyalty rewards, mortgages, car loans, insurance, and wealth.

The context-aware financial information presented in the metaverse can include personalized information, predictive information, or recommendations.

The processing step can incorporate several techniques, including transforming financial data items into a contextualized, interactive, and immersive information experience within the metaverse, categorizing data elements into distinctive zones based on the type of financial data items, using a rendering engine to present the context-aware financial information and enable real-time user interactions within the specific zones, applying data processing algorithms to generate predictive and personalized information based on individual users' financial behaviors and patterns, and generating analytical insights and data from multiple sources within a banking institution's digital ecosystem.

The method can also maintain the privacy of personal and financial data by operating in a consent-based environment, using no-code principles to prevent direct manipulation of code that might expose sensitive information while also enabling rapid prototyping and customization of the metaverse environment, and incorporating various security measures.

The context-aware financial information can include insights and offers associated with the accessed data items. Additionally, the method could involve rendering visual effects within the metaverse environment based on the context-aware financial information.

In addition, the processing of the data operation can include the application of algorithmic visual effects to create an immersive, consent-based experience within the metaverse environment.

The method can also include personalizing the metaverse environment by incorporating user-specific data and preferences.

The data operation can incorporate generative AI language models to process and generate natural language-based financial insights, recommendations, and alerts. It could also utilize large language models to analyze and interpret complex financial data and information.

The metaverse environment can be dynamically updated in real-time based on changes in the user's financial data and contextual information. The method can also incorporate machine learning algorithms and models to analyze and learn from the user's financial behaviors and decisions within the metaverse.

The processing of the data operation could involve the use of distributed ledger technologies, such as blockchain technologies, to secure and validate financial transactions conducted within the metaverse environment, while also facilitating smart contracts to automate transactional processes.

Another embodiment of the invention provides a wearable electronic device with a processor, memory, network interface device, multiple sensors, and a display for a virtual reality environment. The processor is configured to execute the method described above.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method for providing an immersive banking experience in a metaverse environment, the method executed at a wearable electronic device comprising a processor, a memory, a network interface device connected to a network, a plurality of sensors, and a display configured to render a virtual reality environment, the method comprising:

accessing, via the network interface device, a plurality of data items from one or more nodes of a decentralized open banking network, each data item associated with a financial category;

receiving, at the wearable electronic device, a data operation including contextual data from the plurality of sensors, the contextual data comprising at least geolocation, orientation, and motion attributes of the wearable electronic device;

processing the data operation by: maintaining, in the memory, a plurality of predefined three-dimensional zones in the virtual reality environment, each zone corresponding to a respective virtual object and corresponding to a different financial category; for each of the zones, selecting, by the processor, a subset of the data items associated with the corresponding financial category and generating context-aware financial information for the zone based on the contextual data; and determining, from the contextual data, which of the plurality of zones are within a current view of the metaverse environment from a perspective of a user of the wearable electronic device; and responsive to the processing, updating the display by rendering, in only the zones determined to be within the current view, respective immersive three-dimensional interactive graphical elements that present the corresponding context-aware financial information within the metaverse environment.

2. The method of claim 1, wherein the wearable electronic device is a virtual reality headset.

3. The method of claim 1, wherein the wearable electronic device is an augmented reality headset.

4. The method of claim 1, wherein the wearable electronic device is a mixed reality headset.

5. The method of claim 1, wherein the wearable electronic device is a smartphone, tablet, or smartwatch comprising a display screen that is configured to display a simulation of the metaverse environment on the display screen.

6. The method of claim 1, further comprising templatizing the metaverse environment into different zones, each zone corresponding to a different financial category.

7. The method of claim 6, wherein the financial categories include at least one of: credit card, loyalty, benefits, mortgage, car loans, insurance, and wealth.

8. The method of claim 1, wherein the context-aware financial information includes at least one of: personalized information, predictive information, and recommendations.

9. The method of claim 1, wherein the processing further comprises: categorizing the accessed plurality of data items into the spatially distinct zones defined by financial categories comprising credit cards, loyalty rewards, mortgages, car loans, insurance, and wealth management, wherein each spatially distinct zone is visually rendered as a contextualized, interactive, and immersive three-dimensional graphical environment; employing a rendering engine to present the context-aware financial information, allowing real-time user interactions within the spatially distinct zones; implementing data processing algorithms to generate predictive and personalized information based on individual user's financial behaviors and patterns; and generating analytical insights and data from multiple sources within a banking institution's digital ecosystem.

10. The method of claim 1, further comprising requiring user authorization prior to accessing personal or financial data; restricting data processing and display to only data authorized by the user; enabling customization of the metaverse environment without requiring the user to modify program code; and applying data handling procedures that include redacting or replacing identifying information prior to display within the metaverse environment.

11. The method of claim 1, wherein the context-aware financial information includes insights and offers associated with the accessed data items.

12. The method of claim 1, further comprising rendering visual effects within the metaverse environment based on the context-aware financial information comprising interactive 3D representations of financial instruments for tactile engagement, dynamic real-time visualizations of financial trends and predictive analyses, colour-coded symbols and animations for intuitive conveyance of information, contextually triggered visual cues and alerts for potential financial risks or opportunities, and distinct thematic zones corresponding to various financial sectors or products.

13. The method of claim 1, wherein the processing of the data operation further includes generating visual effects within the metaverse environment comprising context-sensitive animations triggered by user inputs detected by the sensors of the wearable electronic device; wherein the animations comprise visual transitions of financial data, opening of interactive windows, or changes in viewpoint in response to user gestures or changes in orientation; and limiting the visualization and interaction with financial data to data items that the user has expressly authorized for use.

14. The method of claim 1, further comprising personalizing the metaverse environment by incorporating user-specific data and preferences, allowing for the creation of a tailored virtual environment that reflects the user's individual financial behaviors, interests, goals, and lifestyle.

15. The method of claim 1, wherein the data operation incorporates generative AI language models to process and generate natural-language-based financial insights, recommendations, and alerts, facilitating an intuitive and conversational interface between the user and the financial metaverse.

16. The method of claim 1, wherein the processing of the data operation further comprises: utilizing a large language model to process financial data items and contextual data associated with the user; generating natural-language-based financial insights, recommendations, or alerts based on the processed data; and presenting the generated outputs within the metaverse environment in association with corresponding financial categories.

17. The method of claim 1, wherein the metaverse environment is dynamically updated in real-time based on changes in the user's financial data and contextual information, ensuring the user receives the most current and accurate financial information and recommendations within the metaverse.

18. The method of claim 1, further comprising incorporating the use of machine-learning algorithms and models to analyze and learn from the user's financial behaviors and decisions within the metaverse.

19. The method of claim 1, wherein the processing of the data operation involves the utilization of distributed ledger technologies comprising blockchain technologies to secure and validate financial transactions conducted within the metaverse environment, while also facilitating smart contracts to automate transactional processes.

20. A wearable electronic device comprising a processor, a memory, a network interface device connected to a network, a plurality of sensors, and a display configured to render a virtual reality environment, wherein the processor is configured to:

access, via the network interface device, a plurality of data items from one or more nodes of a decentralized open banking network, each data item associated with a financial category;

receive a data operation including contextual data from the plurality of sensors, the contextual data comprising at least geolocation, orientation, and motion attributes of the wearable electronic device;

maintain, in the memory, a plurality of predefined three-dimensional zones in the virtual reality environment, each zone corresponding to a respective virtual object and corresponding to a different financial category;

process the data operation by, for each of the zones, selecting a subset of the data items associated with the corresponding financial category and generating context-aware financial information for the zone based on the contextual data, and by determining, from the contextual data, which of the plurality of zones are within a current view of the virtual reality environment from a perspective of a user of the wearable electronic device; and responsive to the processing, update the display by rendering immersive three-dimensional interactive graphical elements presenting the context-aware financial information in only the zones determined to be within the current view, such that financial information from multiple financial categories is presented in spatially distinct zones that remain visually registered to the respective virtual objects as the user moves within the virtual reality environment.

\* \* \* \* \*